United States Patent [19]

Debouzie et al.

[11] 4,433,992
[45] Feb. 28, 1984

[54] PROCESS AND APPARATUS FOR FORMING MINERAL FIBERS

[75] Inventors: Alain Debouzie, Petite Couronne; Daniel Sainte-Foi; Yannick Blandin, both of Clermont, all of France

[73] Assignee: Isover Saint-Gobain, Paris la Defense, France

[21] Appl. No.: 351,521

[22] Filed: Feb. 23, 1982

[30] Foreign Application Priority Data

Feb. 24, 1981 [FR] France ............... 81 03580

[51] Int. Cl.³ .................................. C03B 37/05
[52] U.S. Cl. .................................. 65/3.1; 65/5; 65/6; 65/14; 65/15
[58] Field of Search .............. 65/3.1, 3.43, 5, 6, 65/14, 15, 11.1

[56] References Cited

U.S. PATENT DOCUMENTS

| | | | |
|---|---|---|---|
| 2,561,843 | 7/1951 | Coleman | 65/15 X |
| 2,944,284 | 7/1960 | Tillotson et al. | |
| 3,007,196 | 11/1961 | Levecque et al. | 65/15 |
| 3,022,538 | 2/1962 | Setterberg | 65/14 X |
| 3,159,475 | 12/1964 | Chen et al. | 65/15 |
| 3,343,933 | 9/1967 | Mullan et al. | 65/14 X |
| 3,650,716 | 3/1972 | Brossard | 65/6 |
| 4,342,582 | 8/1982 | Porter | 65/14 |

FOREIGN PATENT DOCUMENTS 1495189 9/1967 France .
2038309 8/1971 France .

Primary Examiner—Robert L. Lindsay, Jr.
Attorney, Agent, or Firm—John T. Synnestvedt; Richard D. Weber

[57] ABSTRACT

The invention relates to a process and apparatus for the manufacture of fibers from attenuable materials, such as glass making materials, by centrifugation. In a process in which the attenuable material is directed onto the peripheral surface of a centrifugation wheel which is enveloped by a gas current produced by a blowing crown, the invention comprises the projecting onto the fibers of a liquid composition from a centrifugation element, the projection being carried out close to the wheel in the form of drops which penetrate and are atomized by the gas current. The apparatus of the invention includes a projection element rotating with the centrifugation wheel for centrifugal delivery of the drops of liquid composition. The invention provides a very uniform treatment of the fibers, particularly by means of liquid binder compositions.

17 Claims, 10 Drawing Figures

PROCESS AND APPARATUS FOR FORMING MINERAL FIBERS

BACKGROUND OF THE INVENTION

The present invention is directed to improvements in fiberizing techniques in which the fiberizing material in a molten state is applied to the exterior of the periphery of the fiberizing wheels, is carried by these wheels and is detached in the form of fibers by centrifugal force. These techniques make up a part of those referred to as "free" centrifugation, as opposed to the techniques in which the centrifugation element, in addition, plays the role of a bushing.

In these techniques, several fiberizing wheels placed adjacent one another are generally used. The material is passed from one wheel to another, each wheel transforming a part of the material received into fiber, and discharging the excess onto the next wheel.

The production of fibers by centrifugation is not limited to these techniques. It is also well known to direct the fiberizing material onto the front of a disk or a rotating spinner, or even to use a drum of which the periphery is perforated with a multitude of orifices forming a bushing from which the material escapes under the effect of centrifugal force.

These last two types of processes are distinguishable from those to which the invention pertains, both by the means employed and by the results which they attain. For example, the centrifugation by means of a disk in practice does not lead to adequately fine fibers for numerous applications; furthermore, the use of certain materials traditional in this kind of manufacture is impossible in a drum forming a bushing, due to, for example, an overly-elevated temperature treatment or the presence of defects in homogeneity of the material.

The techniques wherein fiberizing is carried out by placing the material on the exterior of the peripheral surface in the manner mentioned above, present certain advantages. However, in certain respects this type of fiberizing does not give total satisfaction, despite the numerous improvements which have been proposed up to now.

A first object of the present invention is to permit the implementation of this type of fiberizing under more satisfactory conditions. In particular, the invention proposes to improve the process and equipment for the formation and treatment of the fibers.

Another object of the invention is to improve the quality of the products prepared, particularly with respect to the treatment of the fibers.

Another object of the invention is to increase the fiber yield, that is, the percentage of the material recovered in the form of fibers in relation to the total material used, it being known that one of the primary disadvantages of this kind of technique is the presence of a relatively large quantity of unfiberized products.

Another object of the invention is to improve the quality of the products prepared, particularly the mechanical and insulating properties.

Another object of the invention is to facilitate the continuous operation of the installations by reducing the frequency and the duration of the stoppages required for periodic reconditioning of the equipment.

Due to the numerous factors which effect fiber formation and the finished product, a systematic analysis of these techniques is difficult. This partly explains the diversity of the proposals previously suggested for improving these techniques.

The first studies of these systems were directed toward determining the best conditions for centrifugation: introduction method of the fiberizing material, shape of the surface of the wheels, rotation speed, dimensions, relative position and number of wheels, and related factors.

Subsequently, the emphasis of the studies was placed on the conditions under which the fibers, after detachment from the fiberizing wheels, are treated and transported to the fiber collecting means.

Thus, it was found desirable to subject the fibers to a gas current at the time of their formation, which entrains and separates them from the unfiberized particles.

To improve these techniques, various proposals were also made concerning the treatment of the fibers for their use in the form of insulation mat. Generally, for these uses, the fibers are coated by spraying of a liquid binder composition, intended after drying and/or thermal treatment to confer its cohesion and its mechanical properties to the finished product. To be satisfactory, this treatment obviously must not disturb the so-called fiberizing operation. It must also lead to the coating of the fibers as uniformly as possible.

In one conventional form of treatment, the spraying of the liquid binder composition is carried out in the path of the gas current carrying the fibers toward a collecting surface, the spraying taking place at a distance from the fiberizing wheels. This manner of binder application does not result in a good homogeneity of the coating. The exact reason is unknown but it is noted that the flow of the gas current presents the fibers in an irregular manner to the spraying elements. Furthermore, it is all the more difficult to uniformly coat all the fibers because they have a tendency to become gathered in bundles or roves during their progression toward the collecting surface.

In order to try to improve the application of the coating, it has been proposed to project the sprayed composition into the path of the fibers on the other side of the fiberizing wheels with the same speed and in the same direction as those of the gas current carrying the fibers. However, such measures were not able to satisfactorily improve the results.

To avoid the aforementioned difficulties, it has been conventional practice to spray the binder composition in the vicinity of the fiberizing wheels into the gas current intended to carry the fibers and separate them from the unfiberized particles. In this case, the spraying is effected into these gases before they come in contact with the fibers. By operating in this manner, the fibers are brought in contact with the treating composition immediately upon their formation, under better controlled conditions. Nevertheless, this mode of coating involves certain disadvantages.

One of these disadvantages arises from the presence of the spraying elements close to the surface of the wheel. In this position, these elements are exposed to the heat radiating from the surface brought to high temperature by contact with the molten material. They are also exposed to the accidental projections of molten material. These spray elements especially have a tendency to retain the escaped fibers from the current which leads them toward the receiving surface. These fibers coated with composition, usually sensitive to heat, then undergo a "baking". Deposits are thus formed on the spray elements, rapidly resulting in the obstruction of these elements.

To minimize these disadvantages, spray nozzles can be used in which the orifices are relatively large, which for a given flow leads to reducing the number of nozzles. These nozzles, less numerous, are spaced further apart from each other and the result is a less homogeneous treatment, detrimental to the quality of the finished product.

Furthermore, regardless of the precautions taken, the progressive clogging is not completely prevented, which leads to the obstruction of the spray nozzles, and the interruptions for reconditioning cause relatively frequent stoppages of production.

In the apparatus containing several fiberizing wheels, from the point of view of the circulation of the material from one wheel to the other, it is preferable to avoid the blowing and/or the spraying between the wheels, particularly so as not to cool the material not yet fiberized. In general, an effort is made to form the fibers outside of these zones between the wheels. However, a certain quantity of fibers is either formed in or carried into these zones and is thus not directly touched by the sprayed composition, which increases the risk of defects in homogeneity of the product.

SUMMARY OF THE INVENTION

The improvement of the coating of the fibers, and consequently the improvement of the qualities of the finished product, are among the advantages procured by the present invention which concerns a process for forming a fiber mat or blanket. In this process, the material intended to form the fibers is delivered in an attenuable state to the peripheral surfaces of a plurality of centrifugation wheels. At least a portion of the material on each wheel is projected in the form of fibers in a radial direction in relation to the wheel. The fibers which are formed are carried away toward a collection surface by a gas current directed transversely to the direction of projection of the fibers beyond each wheel. The gas current carrying the fibers is subjected to treatment by a liquid composition.

In the process according to the invention the liquid composition is projected in the form of drops into the gas current carrying the fibers, transversely to the current, by centrifugation from the interior of the generally annular fiber laden gas current and immediately proximate the fiberizing wheel, the drops having sufficent energy to penetrate the gas current to then become finely divided by the high velocity of the latter.

According to the invention, the energy which must be imparted to the drops of liquid composition essentially arises from the rotation of a mechanical element on or through which they are conducted, from which it is delivered into the fiber carrying gas current by centrifugal force. The energy imparted to the drops must be sufficient to enable them to reach and penetrate this current which forms an enveloping layer around the fiberizing wheels.

The centrifugation of the liquid composition is most readily carried out by means of a centrifugation element coaxial with each fiberizing wheel. The composition drops are therefore projected in a path substantially perpendicular to the rotational axis of each wheel and to the gas current carrying the fibers. The projection of the composition is advantageously carried out as close as possible to the fiberizing wheels so as to effect a penetration of the composition drops into the gas currents in a region which is relatively undisturbed by induced air.

A principal advantage of the projection of the composition in the form of drops by centrifugation is the prevention of disturbance of the normal flow of the gas current carrying the fibers as would occur when the composition is sprayed into the stream by a propelling fluid.

A surprising aspect of the invention is the discovery that the relatively large drops which are delivered to the gas current by centrifugation provide an extremely uniform coating of the fibers. In fact, it is preferred that the drops be of relatively large dimension which, depending on conditions of speed of wheel rotation and the gas velocity, could be more than ten times the size of the spray particles produced with conventional aerosol delivery. Behavioral studies of drops introduced into high speed gas currents show that the drops become deformed in a manner which greatly increases their surface area and typically shapes the drops into a large-sized bubble. The bursting of the bubbles and other large-area configurations is believed to play an important role in providing the uniformity of coating of the fibers carried by the gas current. The desirability of introducing the drops centrifugally into the gas current at a point at which the current has a high velocity can thus be understood since the atomizing effect of the gas current is enhanced at high gas speeds.

The invention also pertains to an apparatus for the manufacture of fibers characterized by an element for projection by centrifugation of liquid composition for the treatment of fibers placed in relation to a fiberizing wheel so that the composition is projected in a plane passing close to the downstream edge of the peripheral surface of the wheel. The shape and dimensions of the projection element are such that the composition escapes from the latter at a distance from the rotational axis of the wheel at most equal to the radius of this wheel. It is preferable that the projection element be integral to the wheel and be entrained in rotation by the wheel. Advantageously, the projection element has a symmetrical revolution, and the revolution axis is identical with that of the fiberizing wheel. The projection element preferably has the general shape of a disk.

In a preferred embodiment, the projection element, having the general shape of a disk, is formed by two coupled supports defining between them a compartment in which the composition to be projected is directed. This compartment is connected on one side to a composition feed conduit, and on the other side to one or several orifices placed at the periphery or in the vicinity of the periphery of the disk. In one embodiment, the orifice is formed by a circular slot. When the composition is released through several separate orifices, the distribution and the number of the orifices are such that the projection is carried out practically homogeneously at all points on the periphery of the disk. In this case particularly, orifices can be placed in a circle sufficiently close to one another. If desired, these orifices can be placed in several concentric rows.

The orifices are advantageously disposed along one side of the projection element, and spaced from the periphery of the projection element. In this way the accidental projections of the material being fiberized cannot hit these orifices. When the orifices are not on the periphery, the composition which escapes under the effect of centrifugal force runs along the corresponding side of the projection element to the periphery. To improve the entrainment of the composition on this relatively short path, it is possible to give a particular contour to the part of the side concerned. Therefore, it can be advantageous to make use of grooves or radial ribs.

In all cases the radial dimensions of the projection element are preferably such that the release of the composition drops occurs at a distance from the rotational axis which corresponds to at least 70% of the radius of the fiberizing wheel.

The delivery of the treatment composition to the projection element is preferably effected by means of a feed conduit located coaxially within the shaft of the wheel.

DESCRIPTION OF THE PREFERRED EMBODIMENT

Figure 10:
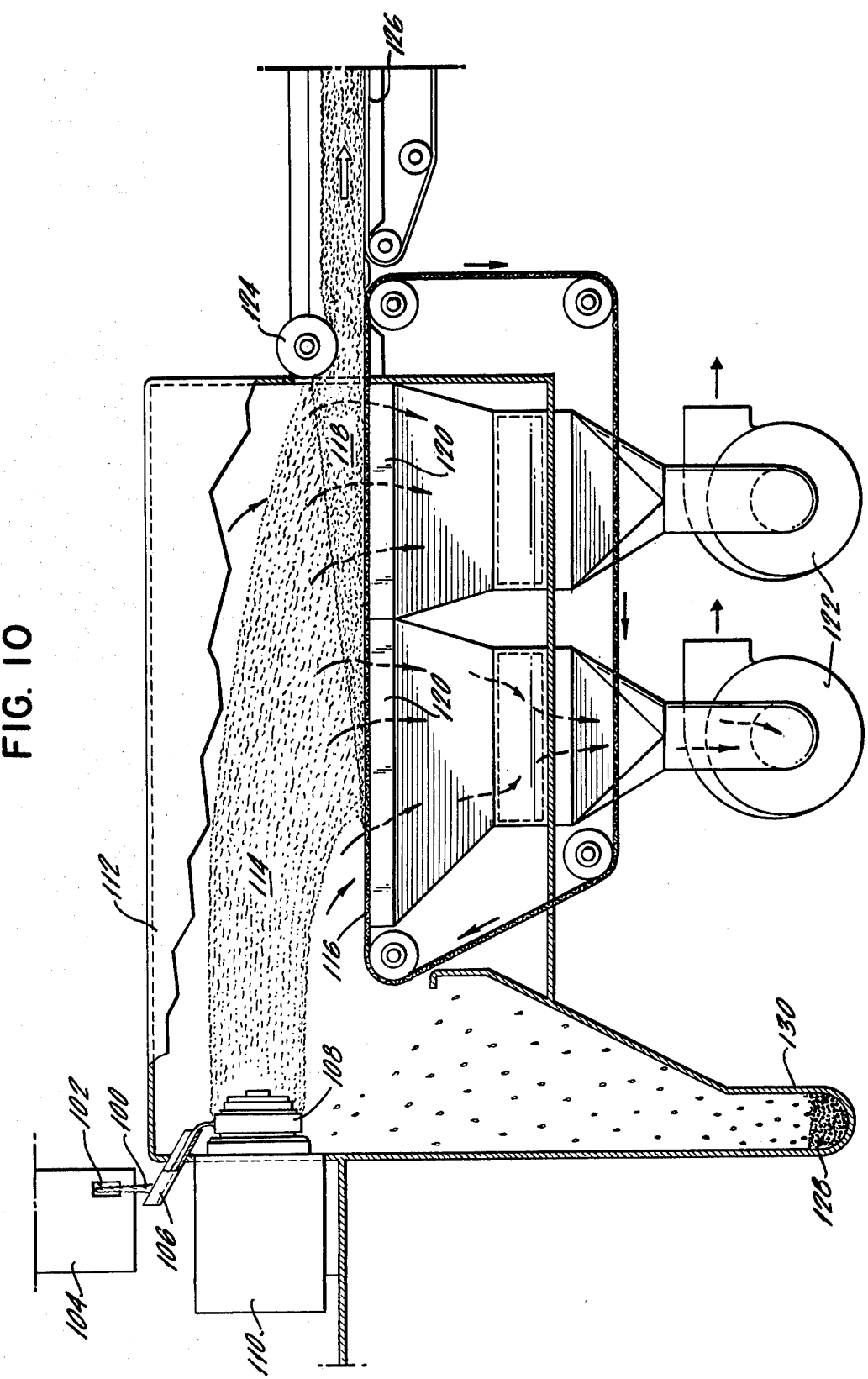
FIG. 10 is a side elevational view partly in section showing the complete fiberizing apparatus including the fiber collection means.

Referring to the drawings and particularly Fig. 10 thereof, fiberizing apparatus of the general type to which the present invention pertains is schematically illustrated. Molten mineral material 100 to be fiberized flows from an outlet 102 in the bottom of a cupola 104 onto a chute 106 for delivery to the rotating fiberizing wheels 108 of a fiberizing device 110. The wheels 108 are disposed within an enclosure 112 and operate in a manner described below to continuously produce a gas current entrained flow of fibers 114 which are collected on a foraminous conveyor 116 to form a blanket or mat 118 of fibers. The fiber carrying gaseous current is drawn through the conveyor into suction boxes 120 which are maintained at a reduced pressure by the blowers 122. The fiber blanket passes beneath the roller 124 and is transferred to a second conveyor 126 for transport to further treatment stations, usually including a curing oven for the binder composition. Unfiberized material 128 is collected in a hopper 130 beneath the fiberizing apparatus.

The apparatus as broadly described thus far is essentially conventional and the present invention pertains in particular to the method and apparatus for applying a liquid binder composition to the fibers just after their formation in the region of the fiberizing wheels 108.

Figure 1:
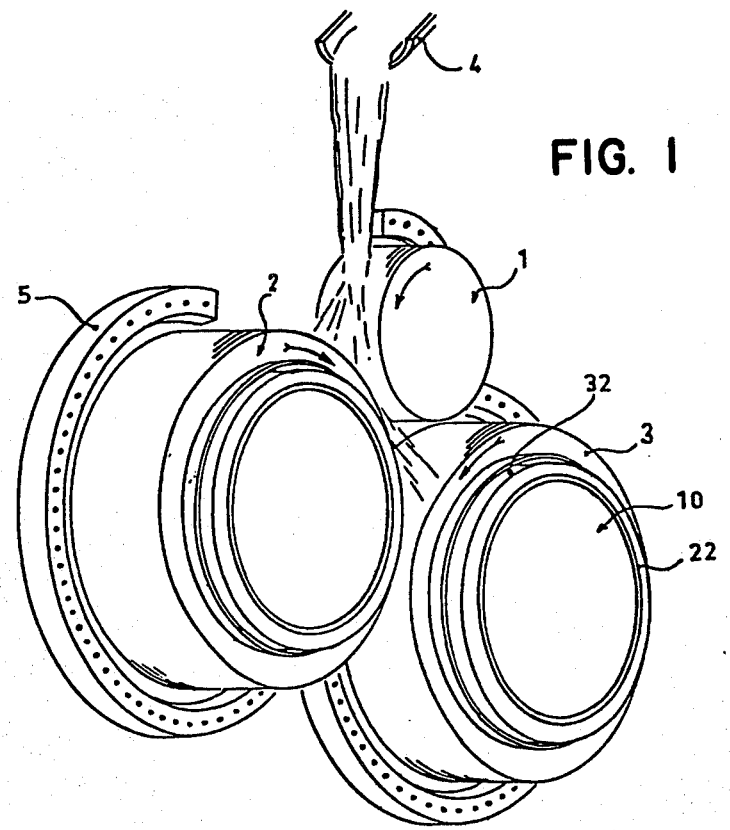
FIG. 1 schematically represents, in perspective, the fiberizing wheels and related elements of a fiberizing apparatus embodying the present invention.
Figure 2:
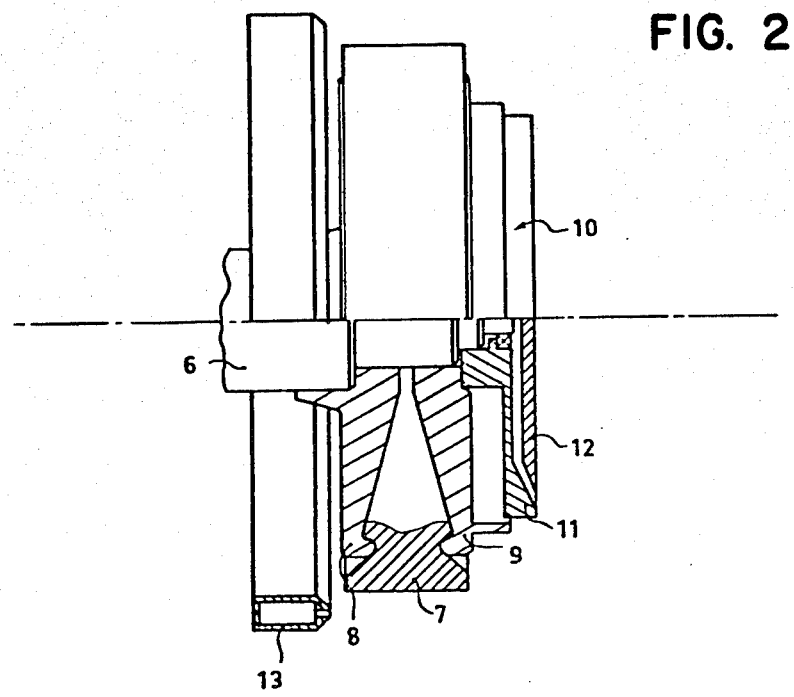
FIG. 2 is a side view partly in section of a fiberizing wheel according to the invention.

As shown in FIG. 1, the fiberizing wheels 108 comprise a plurality of wheels 1, 2 and 3 which are mounted for high speed rotation on parallel axes with the peripheral portions of the wheels in closely spaced relation. The molten material to be fiberized is delivered by the chute 4 onto the peripheral surface of the wheel 1 which serves as a distribution wheel. Upon contact with the wheel 1, the molten material is accelerated and directed onto the peripheral surface of wheel 2 which as illustrated is rotated in the opposite direction from that of the distribution wheel 1. Molten material which does not adhere to the surface of wheel 2 passes onto the peripheral surface of wheel 3 which is rotating in an opposite direction to wheel 2. The material adhering to the peripheral surface of each wheel is accelerated until, by centrifugal force, it becomes detached to form filaments or fibers which are entrained in a gas current partially surrounding each wheel, which current carries them toward the conveyor 16.

The gas current is produced by a flow of pressurized gas passing through orifices in a blowing crown 5 disposed in an arcuate manner around a portion of the periphery of each wheel. The blowing crowns 5 extend around those portions of the wheel wherein fiberizing takes place and normally do not extend into those regions wherein the wheels are in adjoining relation and wherein transfer of molten material between the wheels is effected.

Although the apparatus shown in FIG. 1 includes three wheels, apparatus having two or four wheels may also be employed operating in accordance with the same principles.

Figure 9:
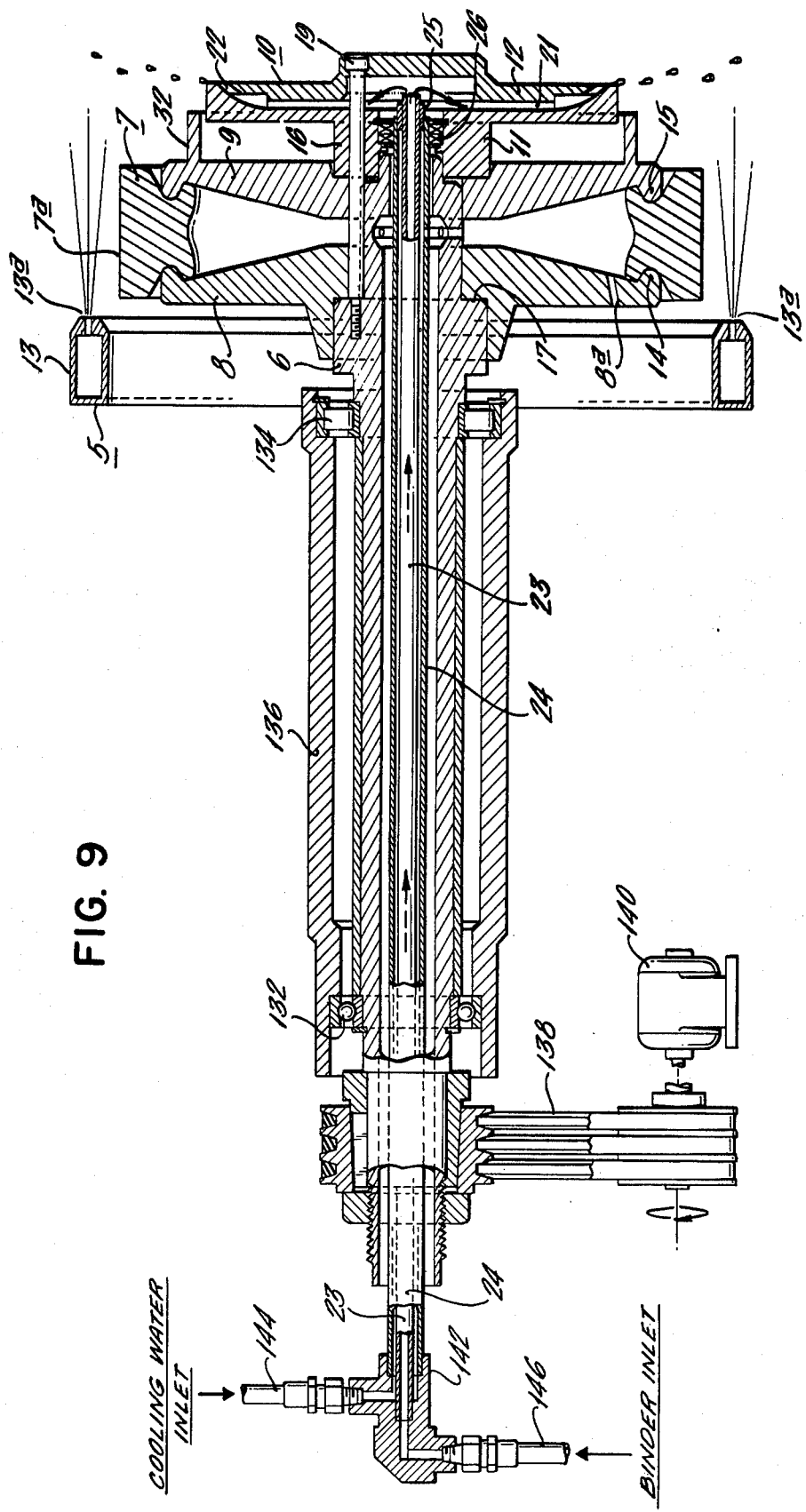
FIG. 9 is a sectional view taken longitudinally through one of the fiberizing wheels showing details of the cooling water and binder conduits.

In FIG. 9, the details and the mounting arrangements of one of the wheels is illustrated as well as the drive arrangement for rotating the wheel and the conduits for the wheel cooling water as well as the liquid binding composition. The wheel is formed of a rim 7 having a substantially cylindrical peripheral surface 7a and is supported by circular support members 8 and 9 mounted on a shaft 6. The shaft 6 is rotatably supported by bearings 132 and 134 within the housing 136 fixedly mounted to the frame of the apparatus 110. The shaft 6 is rotated by the belt drive 138 connecting the shaft with a drive motor 140.

The blowing crown 5 comprises a hollow manifold 13 secured to the frame of the fiberizing device. Orifices 13a directed parallel to the axis of the wheel direct a gaseous current from the manifold generally parallel to the surface 7a of the wheel to entrain fibers generated thereby. (The source of pressurized gas and its connection to the manifold are not shown).

A liquid binder composition projection element 10 is concentrically disposed on the downstream side of the wheel and is formed of an inner element 11 and an outer element 12 which are held together and which in turn hold the wheel to the shaft by means of screws 19. The support member 8 of the wheel is engaged with a shoulder 17 of the shaft to secure the wheel in a predetermined position on the shaft. Similarly, a hub portion 16 of the inner member 11 of the projection element is seated in a recess of the support member 9 of the wheel.

The support members 8 and 9 respectively include projections 14 and 15 which are seated within a corresponding groove of the wheel rim 7.

Figure 7:
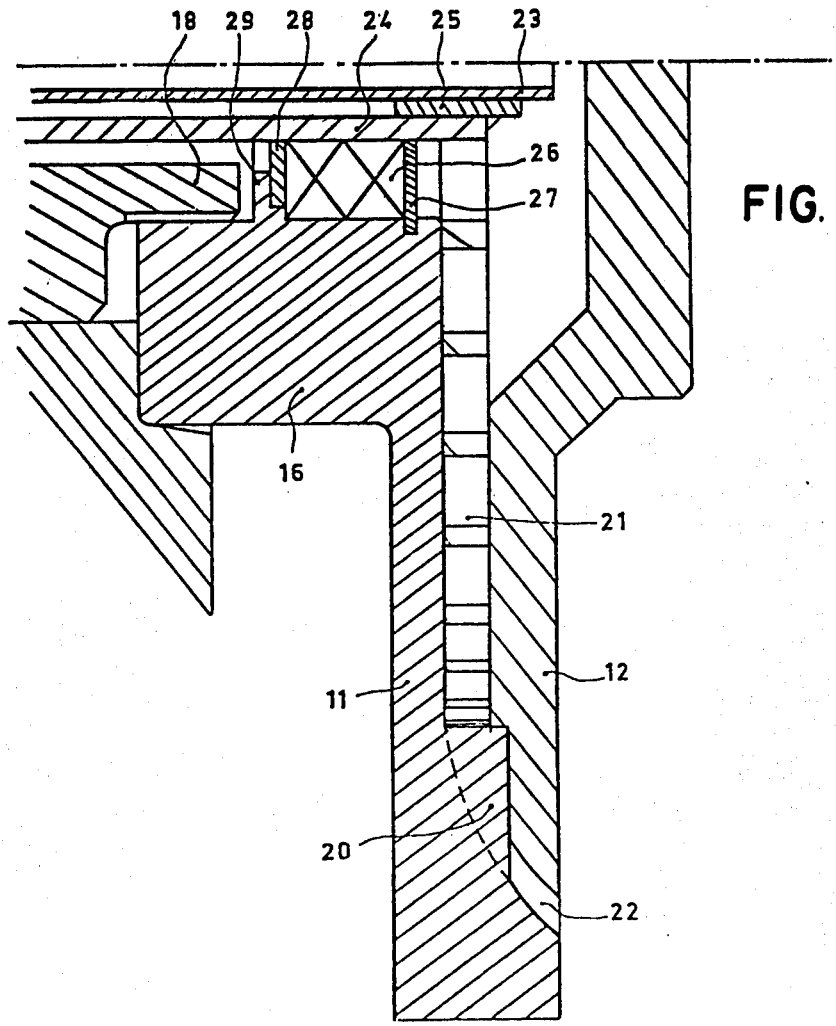
FIG. 7 is a sectional view showing the details of the passages conducting the treatment composition and the projection element of this composition.

The details of the projection element 10 as well as the conduits for introducing the liquid binder composition to the projection element and the cooling water to the interior of the wheel are most clearly illustrated in FIGS. 7 and 9. An internal segmented shoulder 20 of element 11 cooperates with a groove of element 12 to define an internal chamber 21 through which the liquid binder composition flows radially outwardly under the effects of centrifugal force toward a continuous circular slot 22. As shown in FIG. 7, the slot 22 connects with the chamber 21 by means of a series of spaced passages between the segments of the shoulder 20 which provides a uniform distribution of the composition around the entire circumference of the projection element.

The liquid binder composition as well as the cooling water for the wheel are led into the mechanism through a hollow central bore in the shaft 6. A conduit 23 carries the liquid binder composition into the center of the chamber 21. An overlying concentric conduit 24 carries the cooling water to the wheel, the water flowing through the annular passage between the interior of the conduit 24 and the exterior of the conduit 23. This annular passage is closed at the wheel end of the shaft by an annular stopper 25.

The two concentric conduits are supported coaxially within the shaft by a bearing mechanism 26 disposed within the hub 16. The bearing 26 is secured against axial movement by the circular clip 27. A seal ring 28 is disposed against a shoulder 29 of the hub 16 at the inner end of the bearing 26.

At their inner ends, the conduits 23 and 24 are supported by a fitting 142 which maintains the concentric disposition of the conduits and which connects the conduit 24 to a source 144 of cooling water and the conduit 23 to a source 146 of liquid binder composition.

Figure 3:
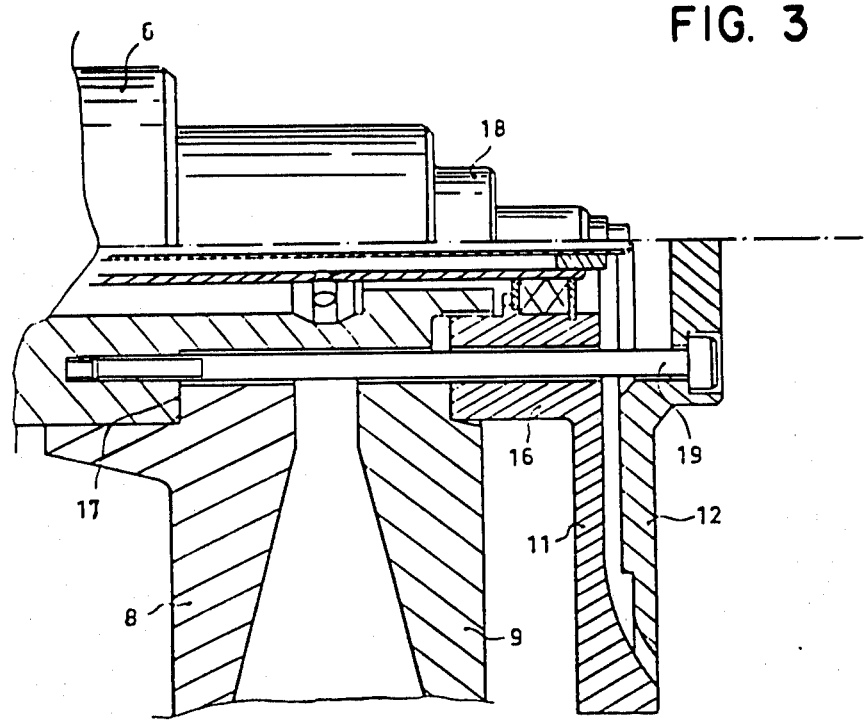
FIG. 3 is a partial view, on a larger scale, of the apparatus represented in FIG. 2.
Figure 6:
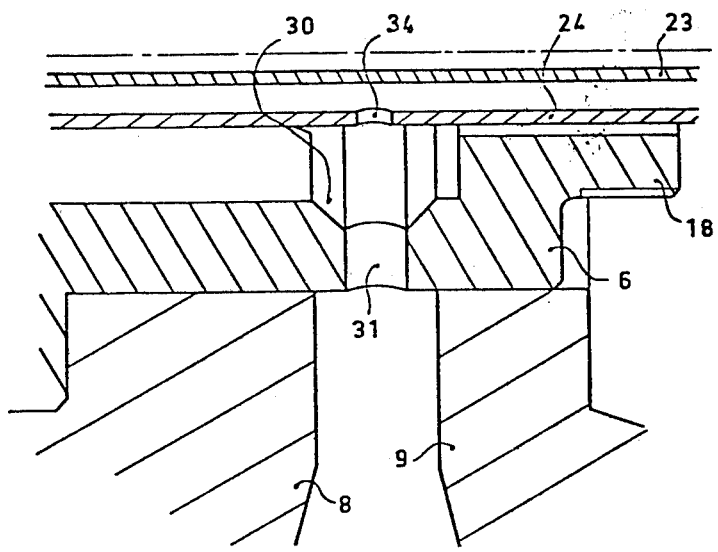
FIG. 6 is a sectional view of a detail of the flow path of the cooling water.

The cooling water flows through the conduit 24 and passes through opening 34 in this conduit, one example of such opening being shown in FIG. 6. The water passing through the openings 34 enters an annular groove 30 in the interior wall of the shaft 6 from which it flows through a plurality of openings 31 in the shaft wall which are disposed between the support members 8 and 9 of the wheel. The openings 31 are also arranged to avoid the screws 19 as shown in FIG. 3.

The cooling water passes into the hollow wheel cavity formed by the support members 8 and 9 and the rim 7 and after engagement with and the cooling of the surfaces of these members, is evacuated (possibly in vapor form) through openings 8a.

Figure 8:
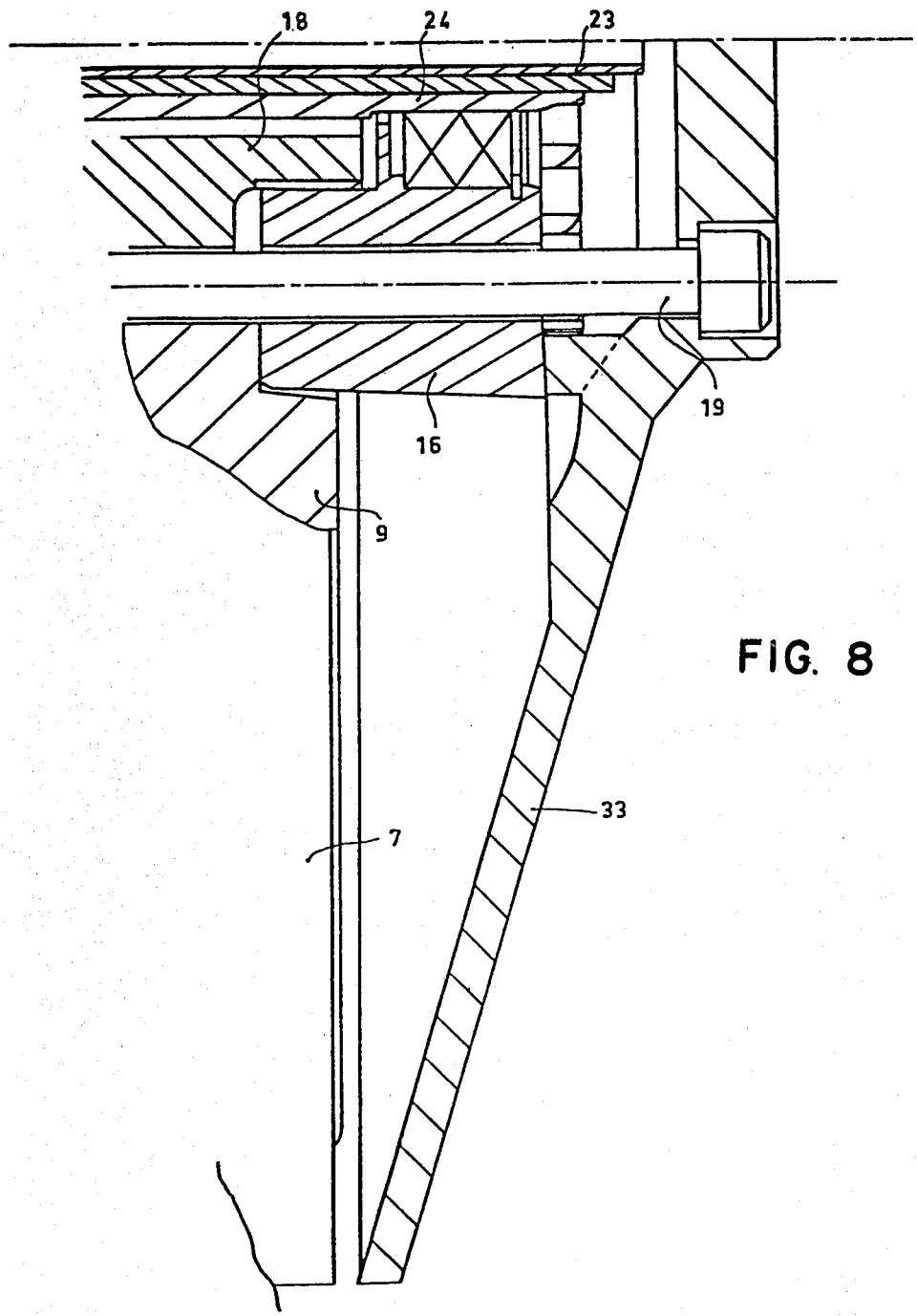
FIG. 8 presents a partial section of another type of element for projecting the treatment composition.

A modified form of the binder composition projection element is shown in FIG. 8. This embodiment differs substantially from that previously described in the sense that the binder composition leaving the conduit 23 is not kept within a confined space. Instead, the composition is applied to the inner surface of a cone-shaped disk 33, the inner concave side of which is turned toward the fiberizing wheel. The binder composition accordingly progresses under the influence of centrifugal force along the inner side of the disk toward the disk periphery from which it is released in a radial direction in the form of drops.

Figure 4:
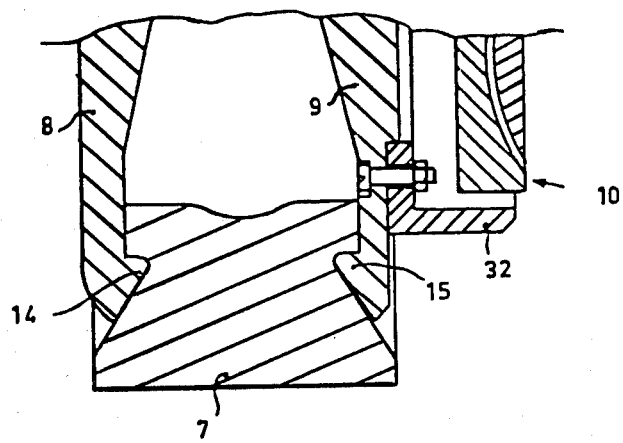
FIG. 4 is another partial view, on a larger scale, of the apparatus of FIG. 2.

To provide protection for the projection element 10 from stray particles of material from the fiberizing wheel, a flange 32 may be utilized as shown in FIG. 4 and Fig. 9. The flange 32 is an annular flange which is attached to the outer face of the wheel on the support member 9 and partially envelops the projection element 10. The part of the projection element from which the composition drops are released should not, of course, be covered by the flange 32. The flange 32 is preferably demountable as shown in FIG. 4 to permit its replacement as it becomes worn from contact with material particles.

Although the rim surface 7a is illustrated in the drawings as a smooth surface, in practice, to facilitate the attachment of the fiberizing material, this surface is normally provided with a plurality of peripheral grooves.

Figure 5:
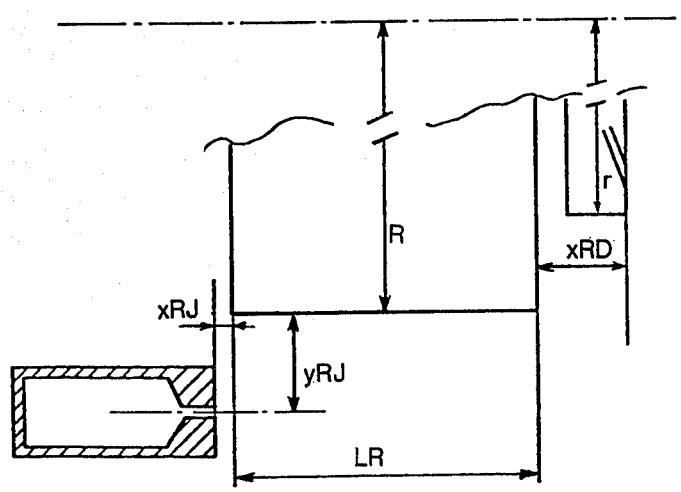
FIG. 5 schematically represents the principal elements of the apparatus according to the invention with measurement indications fixing the relative position of these elements in relation to each other.

The parameters useful for defining the relationships of the elements implemented according to the invention are indicated on FIG. 5. They are the following:

the respective radii of the wheel R and the projection element r, the distance from the downstream edge of the fiberizing wheel to the projection plane of the composition $x_{RD}$, the radial distance from the surface of the wheel to the axis of the jet $y_{RJ}$, the distance from the jet orifices to the plane of the upstream edge of the wheel $x_{RJ}$, the width of the fiberizing surface of the wheel $l_r$.

EXAMPLE

A fiberizing apparatus is used comprising three wheels arranged in the manner represented in FIG. 1.

The diameters of the wheels and their rotation speeds are respectively:

| distribution wheel | 185 mm | 3000 rpm |
| --- | --- | --- |
| 1st fiberizing wheel | 485 mm | 4200 rpm |
| 2nd fiberizing wheel | 458 mm | 4600 rpm |

The width($l_R$) of the surface of the fiberizing wheels is 85 mm (the surface is longitudinally channelled).

The blowing element envelopes the wheels in the manner represented in FIG. 1. It comprises a series of orifices, a total of 405, of which the opening diameter is 2 mm. The spacing between two consecutive orifices is 6 mm. These orifices are at a radial distance from the wheel $y_{RJ}$ of 30 mm and at an axial distance $x_{RJ}$ of 10 mm.

The gas (steam) used is at a pressure of about $3.5 \times 10^5$ Pa. The complete apparatus blows a quantity of vapor of about 2.5 tons/hour.

The projection of binder is effected adjacent the two fiberizing wheels by apparatus such as that represented in FIG. 7. The diameter of the centrifugation disks is 320 mm.

An aqueous binder composition is projected which is made from a resole (phenol-formaldehyde) resin.

The fiberized material is a melilite glass. The feed output is about 3 tons/hour.

A fiber mat is formed having a thickness of 50 mm and thermal conductivity at 23.9° C. of 38.2 mW/m.° C.

As a comparison, the fiberization is carried out under analogous conditions while spraying the binder into the gas current upstream of the wheel.

In this test the blowing crown comprises only 33 orifices, 16 of which are used in the spraying of the binder. The diameter of the orifices 3 mm. They are arranged at a radial distance $y_{RJ}$ of 120 to 150 mm.

The delivery orifices of the binder have a diameter of 2 mm.

The vapor pressure in the blowing crown is 3 to $4 \times 10^5$ Pa. the vapor consumption is 1.2 tons/hour.

The other conditions are the same as for the example according to the invention.

The fiber mat obtained by this comparison example presents the same insulation characteristics, however, its mechanical properties are not as good as that in accordance with the invention, as is indicated in the table below.

The product obtained according to the invention presents a significant improvement in the pull resistance, which characterizes the "cohesion" of the mat, and a lower depression rate under pressure.

Furthermore, during prolonged testing, no clogging of the projection element of the invention was discovered. In fact, no stoppage was necessary for the cleaning of this projection element during a continuous operation period of 600 hours.

The invention therefore enables an improvement in the operating conditions for fiberizing techniques of the type considered, while maintaining or even improving the quality of the products obtained.

| Properties | Comparative Ex. | According to the Invention | Relative Difference |
|---|---|---|---|
| Thermal conductivity at 23.9° C. mW/m. C. | 38.2 | 38.2 | 0 |
| Pull resistance Perpendicular to the surface daN/dm$^2$ | 13.0 | 15.5 | 19% |
| Depression rate under pressure 0.4 × 10$^5$Pa. | 4.6 | 4.2 | 10% |

The method for projection of the treatment composition according to the invention are also noteworthy for its adaptability. In particular, it enables compositions of different types to be projected with the same facility.

Although the phenol-formaldehyde resins are the most frequently used, other binder products are also of interest. This is the case with compositions made from drying oil, especially linseed oil which has the advantage of being relatively inexpensive.

In the traditional modes of application, the use of linseed oil, or compositions made from linseed oil, presents certain difficulties.

The viscosity of linseed oil is much higher than that of the phenol-formaldehyde resins and in the products bonded with linseed oil the proportion of binder is ordinarily lower. These two aspects, smaller quantity and higher viscosity, cause the tendency toward obstruction of the atomizing orifices to be considerably increased, to the point that this type of binder is rarely used.

In the method for projection of the binder according to the invention, the particularities of the compositions made from linseed oil have posed no difficulties. The centrifugation is carried out normally and the fibers are coated quite satisfactorily.

In testing various compositions, the self-cleaning character of the apparatus appeared particularly advantageous. The transition from one composition to another can be achieved practically instantaneously and without it being necessary to carry on a prior cleansing operation.

Since the projection of the drops is not restricted to a particular sector of the wheels, with the present invention all the fibers will be submitted to the liquid composition treatment, even those which might appear between the wheels.

In practice the projection of the treatment composition takes place close enough to the fiberizing wheel so that the drops meet the gas current carrying the fibers at a point where its flow is not yet substantially disturbed by mixture with the induced air. Of course, the disturbance in the flow caused by this mixture progressively increases as it travels further from the wheel. There is no so-called strict limit, but the closer to the wheel the composition is delivered on the one hand, the more intense is the action of the gas current on the drops of composition and, on the other hand, the more improved is the uniformity of the distribution of the composition particles at the heart of the gas current carrying the fibers (particularly because the useful dimensions of the current are relatively restricted at this point of its progression).

In the preferred embodiment, the distance separating the downstream edge of the centrifugation wheel from the plane of projection of the treatment composition does not exceed 150 mm, and is preferably less than 60 mm.

Taking into account the equipment and/or the operative conditions, if it seems necessary, a minimum distance between the downstream edge of the wheel and the projection element can be maintained to prevent, for example, heat transfers from disturbing the operation of the element.

The centrifugation element releases the treatment composition at a distance from the rotational axis so that the drops acquire enough force to reach and penetrate the gas current carrying the fibers. The smaller the distance separating the point where the drops are released from the projection element is from the gas current, the greater is the force conferred. Furthermore, the localization of the meeting point of the drops with the gas current is much more assured when the distance traversed by the drops is shorter, without the support of this projection element. However, although it seems advantageous to reduce this distance, there must nevertheless be a certain space between the gas current and the extremity of the projection element to avoid disturbing the trajectory of the fibers and to avoid subjecting this element to the particles of molten material which, overflowing from the surface of the wheel, accidentally hit the element.

The radial speed to be communicated to the composition, at the periphery of the projection element, can vary as a function of numerous factors: size of the drops, distance from the gas current, speed of the gas current, etc. Considering the parameters of dimension of the equipment, and also the characteristics of the gas current, the preferred speeds range is between 50 and 120 m/s and more particularly between 70 and 100 m/s.

An important advantage related to the fact that the composition is projected by centrifugation is the prevention of disturbance of the normal flow of the gas current carrying the fibers as would occur by use of spray nozzles downstream of the fiberizing wheel, as is the case when spraying is achieved by means of a propelling fluid. The impact of the composition drops on the flow of the gas current is considerably less than that of the spraying nozzles. The risk of creating eddies and the disadvantages stated, particularly concerning the coating of fiber roves, are thus reduced.

Normally, the treatment composition is transmitted to the projection element with a pressure which does not exceed that pressure needed for its progression to this element. Nevertheless, it is possible to transmit the composition with a stronger pressure, in which case the centrifugal projection force may be somewhat augmented by the fluid pressure force.

Contrary to that which was previously believed, it is unnecessary to effect a very fine dispersion of the treatment composition by the projection element to have a good coating of the fibers. To facilitate the projection and the penetration of the drops in the gas current, it is even preferable that these drops be of relatively large dimension. This results from the fact that the atomization and dispersion of these drops takes place, as indicated above, by the action of the gas current. In fact, the introduction of the composition in the gas current, in the vicinity of the fiberizing zone, that is at a point where the gas current presents a maximum speed and force, promotes the bursting of the drops and even more so as their volume is increased.

The atomization of the composition drops by the gas current carrying the fibers is a particularly advantageous characteristic of the invention. In this manner, a composition is obtained which is as finely divided as is obtained by means of spraying, without experiencing the above-noted disadvantageous, namely, either the difficulty of causing the aerosol to penetrate the gas current at high speed, or the presence of spray nozzles in a position detrimental to their good operation. In fact, on the one hand the centrifugal drops penetrate the gas current more easily than an aerosol, and, on the other hand, by the very reason of its mode of operation, the centrifugation element presents a characteristic which can be called "self-cleaning" (this particularly in the case where the projected composition assures a cooling of the projection element and thus prevents the adhesion of the fibers).

Another advantage of the atomization of the drops by the current is related to the manner in which this atomization is effected. The behavioral study of a drop projected in an intense gas current shows that the production of multiple smaller particles is the outcome of a series of deformations during which the "deformed" drop sees its dimensions considerably increased. These deformations can take on several forms and particularly that of a large-sized bubble. This deformation process not only accomplishes the atomization of the drops, but, in addition, increases the probability of the composition particles meeting with the fibers, taking into account the initial increase of the drop dimensions.

Generally, regardless of the phenomena to which the drops are subjected, the result is a good homogeneity of their dispersion within the gas current and, consequently, a good distribution of the composition on the product recovered on the collecting surface.

In practice, many of the parameters which determine the conditions under which the drops are projected, enter into the gas current and are divided, are fixed as a function of the fiberizing conditions. This is especially the case of the rotation speed of the wheel when the projection element is interdependent of the latter. To a certain degree this is also the case of the characteristics of the gas current. Nevertheless, certain parameters can be varied to optimize the characteristics of the composition drops. Essentially these include the position of the projection element, its geometry, and particularly the distance from the rotational axis to the point where the drops escape. It is also possible to modify the orifices of the projection element or the flow of the composition through this element.

Under the preferred conditions of speed of rotation and blowing, which are given above as examples, drops could be projected the average dimensions of which are more than 10 times those of the traditionally used aerosols known for providing a good distribution. For instance, in an aqueous binder composition traditionally sprayed on mineral fibers, 90% of the droplets have an average size of on the order of 30 μm. When according to the invention the composition is projected by centrifugation, the drops typically formed have dimensions comprised between 50 and 500 μm, and an average dimension of on the order of 250 μm.

As indicated above, the use of a rapid gas current is favorable to the dispersion of the treatment composition by facilitating the atomization of the drops. Furthermore, the choice of a gas current at high speed could have a favorable influence on the fiberizing rate and even on the quality of the finished product.

The specific reasons for these improvements are not perfectly understood. Concerning the improvement of the fiberizing rate, it could be surmized that a certain quantity of unfiberized, or insufficiently fiberized, particles is complementarily attenuated upon penetrating the gas current, and even more so when the speed of the current is more rapid. For the finished product, the following hypothesis can be put forward.

By forming a rapid gas current in the fiberizing and coating zone, a flow is created in this zone which carries along the fibers while maintaining them in a dispersed relation. The whirling movements, caused by the mixture of the gas current with the induced ambient air and which are supposed to favor the development of roves, are repelled to a distance from the fiberizing wheel. The dispersion of the drops and their spraying are developed at a time when the fibers are well individualized. In the gas current, the mixture of composition particles and fibers is consequently quite homogeneous, even if roves are formed during the subsequent progression toward the receiving surface. Furthermore, by transferring toward the receiving surface the phenomena developing the roves, the time is reduced during which this development can be produced and, therefore, the number and size of the roves.

Regardless of the phenomenon leading to this improvement, it is certain that the blowing conditions of the gas current in these techniques of fiberizing by centrifugation from the peripheral surface of the wheel are different from those which were previously utilized.

In the prior techniques the purpose of the blowing, as was indicated, is essentially to carry the fibers toward the receiving surface and possibly to achieve a separation of the unfiberized particles which, in both cases, can be obtained at relatively low speeds. According to the invention, the blowing operation on the other hand seems to enhance the conditions under which the fibers are formed and treated. Contrary to what was previously believed, the increase of the speed of the blowing gas, within the limits indicated, does not disturb the formation of the fiber and improves the quality of the finished product.

In practice, the gas current is established in the vicinity of the surface of the wheel, however, not directly in contact with the latter. Initially, it is necessary for the proper operation of the system for the fibers to be formed and developed under the effect of centrifugation. A current running along the surface, especially if it is rapid, could disrupt the material disposed on the surface of the wheel without allowing the formation of fibers. On the other hand, the gas current, to play its role, must not be too far from the surface of the wheel. In fact, regardless of the initial ejection speed of the material forming the fibers, these fibers, due to their fineness, are slowed up. In order to insure that the fibers are projected into the gas current, the distance which separates the latter from the surface is therefore necessarily limited. Preferably, this distance is on the order of 10 to 200 mm and preferably 25 to 100 mm.

The gas current is established peripherally around the centrifugation wheel in the sector of the latter from which the fibers are generated. With a unit containing several fiberizing wheels, the gas current is preferably established on the circumference of the wheels in the sectors where the wheels are not facing each other. Under these conditions, the gas current forms a sort of envelope for the group of wheels. A single element or a plurality of elements can be employed for generating the gas current.

The gas current arranged as was just indicated, in the zone where it meets the fibers, must also have a speed sufficient so that the favorable effects noted above are obtained. Of course, this speed must not be such that it results in the destruction of the fibers. To a certain extent, although shorter fibers do not constitute a disadvantage and even contribute to the reduction of the number and/or importance of the roves, fibers must nevertheless have a length sufficient to be able to constitute the texture of insulating mat. The preferred conditions for the speed of the gas in the zone in question ranges between 50 and 180 m/s and preferably between 100 and 150 m/s.

The speed of the gas current can be considered in relation to the speed which is communicated to the material by the centrifugation wheels. For these latter, the preferred speeds depend on numerous factors, in particular, on the nature of the material to be treated, on its viscosity, on the surface of the wheel, etc. For the treatment of materials of the types such as slag smelting, basalt, diabase, glass or analogous materials used for the formation of mineral fibers, the preferred peripheral speeds of the fiberizing wheels are on the order of 60 to 150 m/s. Under these conditions, the relation of the speed of the gas current to the peripheral rotation speed is preferably between 1.8 and 0.8 and more particularly between 1.5 and 1.

The speed of the gas current is associated with that of the fiberizing wheel since it appears that, to a certain extent, these two factors are dependant upon one another, in the establishment of the operative conditions. Overall, it is seen that the increase in the speed of the gas can lead to a decrease in the unfiberized rate and to a complementary attenuation of the fibers. In other words, the increase in the speed of the gas leads to the production of finer fibers.

The pressurized gases used to establish the gaseous current are those conventionally used for this purpose, including air, steam, and combustion gases.

For certain uses it can be undesirable to have too fine a fiber, for example, for reasons of firmness or temperature resistance. To preserve the advantages of high speed blowing without so much reducing of the diameter of the fibers, the speed of the fiberizing wheel can be reduced.

The user can thus make use of a supplementary means for regulating the fiberizing conditions by adjusting the combination of the speed of the gas and the speed of the wheel to values leading to the best results. This supplementary possibility is quite appreciable, for example to better establish the location of the zone of the wheel from which the fibers become detached.

The quantity of gas blown must be sufficient to assure a practically uniform speed all along the surface of the wheel. This quantity must also be sufficient to contain and carry along the material constituting the fibers, as well as the treatment composition. Advantageously, for the water vapor, the quantity blown is comprised between 0.5 and 2 Kg per Kg of fiberized material. Considering the geometry of the unit, as can be proven, the gas current enveloping the wheels need have a relatively limited thickness. A more voluminous current would also be usable but the result would be an increased gas consumption without substantial supplementary improvement in the quality of the products obtained.

Since the gas is blown across the circumference of the wheels only in the zones where the fibers become detached, the quantity of gas blown can be advantageously regulated as a function of the quantity of fibers which are detached in the zone in question. It goes without saying that, in a given zone, the force and therefore the quantity of gas necessary are greater as the fibers are more abundant.

The gas jets of small dimensions rapidly lose speed upon contact with the ambient air. Also, when such jets are used to form the gas current according to the invention, it is preferable to place the emission orifice(s) in the vicinity of the wheel. In other words, the distance of the emission orifice(s) to the upstream edge of the surface of the fiberizing wheel is advantageously as small as the construction parameters permit. By bringing these orifices nearer to the surface of the wheel, it is assured that the speed of the current at the level of the wheel is hardly different from that at the point of emission. Also in this manner, in the vicinity of the fiberizing wheel, a current is provided, the geometry of which is relatively well defined. The distance between the emission orifice(s) and the plane of the upstream edge of the surface of the wheel is advantageously less than 50 mm.

The emission orifices can be located at the plane of the upstream edge of the surface of the wheel or even slightly downstream of the latter without interfering with the path of the fibers. In such case, even before being carried along in the gas currents issuing from the blowing element, the fibers are picked up by the induced currents.

In the radial direction the orifices are at a sufficient distance so that the gas current, essentially oriented in the direction of the axis of the wheel, does not blow on the peripheral surface, as indicated above. Preferably, the distance in the radial direction separating the surface of the wheel from the axis of the orifices is on the order of 25 to 100 mm. In the axial direction, the orifices are as close as possible to the edge of the wheel and preferably at less than 10 mm.

Whether the orifice is formed by a slot or by a row of separate orifices, the gas current must be presented as a substantially continuous layer when it meets the fibers. According, if there are multiple orifices, they must be close enough so that the adjacent jets meet.

Ordinarily a single row of orifices is used, however, if it appears necessary, either to enlarge the gas current or to assure a more constant speed along the entire surface of the fiberizing wheel, it is also possible to implement several rows of orifices having among them similar or varying characteristics. In particular, when several rows are used, the following characteristics can vary: the dimensions of the orifice, their inclination in relation to the axis of the wheel or their relative position in relation to the wheel.

The number or dimension of the orifices can advantageously be chosen as a function of the zone to which these orifices correspond. In the zones where a large quantity of fibers become detached, it is preferable to have larger or more numerous orifices.

When orifices of small dimensions are used, that is orifices of which the width does not exceed 6 mm and preferably is comprised between 0.5 and 5 mm, and under the conditions indicated above for distance between these orifices and the surface of the wheel, the pressure necessary to confer adequate speeds to the gas current is ordinarily between 1 and $10 \times 10^5$ Pa.

According to the invention, it is also possible to carry out several different operations for treatment of the fibers by means of liquid compositions, at least one of these operations being achieved according to the details precedingly described.

These operations can be successive or simultaneous and implement identical or different compositions. Therefore, in the formation of insulating mat made from mineral materials, the fibers, for example, can be treated by means of two compositions which, by reaction, form a binder, or even by separately projecting a binder composition and a tensioactive composition, etc.

To prevent heat transfer between the fiberizing wheel and the projection element when they are made integral, it is preferable that their attachment occur in the vicinity of the hub, that is, in a region little exposed to heat, and that there be a certain spacing between the support of the wheel and the projection element. Since it is heat transfer by conduction that is to be avoided, this spacing can be of small dimension; this minimizes the distance the drops are projected in relation to the edge of the peripheral surface of the wheel. In practice, a spacing of a few millimeters can be sufficient. This spacing is less cumbersome as, by their shape, the supports of the wheel can be recessed in relation to the working surface of the wheel. In other words, the working surface of the wheel can protrude overhung beyond the supports and even possibly over a portion of the projection element.

In all cases, the radial dimensions of the projection element are preferably such that the release of the composition drops occurs at a distance from the rotational axis which corresponds to at least 70% of the radius of the fiberizing wheel and at most equal to the radius of the wheel.

We claim:

1. A process for the manufacture of fibers in which the material intended to form the fiber is conducted in the attenuable state onto a centrifuge apparatus comprising several wheels driven in rapid rotation, the material in the form of a voluminous stream being flowed toward the external peripheral surface of a first wheel where it is accelerated and discharged onto a second wheel rotating in the opposite direction of the first, at least a portion of the material adhering to the surface of the said second wheel then being delivered by centrifugal force in the form of fibers, excess material not adhering to the wheel being discharged onto a third wheel rotating in the opposite direction of the second, the peripheral speed of said wheels being between 60-150 m/s, the fibers delivered from the various successive wheels being projected into a rapid gas current transverse to their trajectory, said gas current having a speed sufficient to complete the attenuation of the said fibers and carry them toward a receiving element, and in which a liquid composition for the treatment of the fibers is projected by centrifugation, transversely to the gas current carrying the fibers, in the immediate vicinity of the wheels, under conditions such that drops of the liquid composition of a size sufficient to penetrate the gas current are formed, the speed of the gas current being between 50 and 180 m/s in a region adjoining the periphery of the wheels, the ratio of the speed of the gas current to the peripheral speed of said wheels being between 0.8-1.8.

2. A process according to claim 1, characterized in that the projection of the liquid composition is effected in a plane perpendicular to the axis of at least one of the wheels.

3. A process according to claim 1, characterized in that the projection of the liquid composition is effected at a distance from the axis of at least one of the wheels which is not less than 70% of the radius of that wheel.

4. A process according to claim 1, characterized in that the respective speeds of the gas current and the projection of the drops is regulated so that the average dimension of the droplets after spraying is at most equal to a tenth of that of the drops projected by the centrifugation element.

5. A process according to claim 4, characterized in that the drops projected have an average dimension on the order of 150 μm.

6. An apparatus for the production of mineral fibers, and the coating of these fibers in suspension in a gas current by a liquid treatment composition, comprising a series of wheels arranged according to an assemblage which places their peripheral surfaces close to one another, means for driving said wheels to provide a peripheral wheel speed of between 60-150 m/s, two consecutive wheels on the path of the fiberizing material rotating in opposite directions, a feed means arranged so as to provide for the fiberizing material to be flowed on the exterior surface of the first wheel of the series, at least one blowing element producing a high speed gas current around said wheels in the regions thereof from which the fibers are delivered transversely to the trajectory of the fibers beyond the fiberizing wheels, said blowing elements providing a gas current having a speed of between 50–180 m/s and capable of completing the attenuation of the fibers, and a means for centrifugal projection of a liquid composition for treatment of the fibers formed in the immediate vicinity of the fiberizing wheels, said means providing for projection of the composition in the form of drops transversely to the trajectory of the gas current carrying the fibers.

7. An apparatus according to claim 6, characterized in that the means for centrifugal projection of the composition is integral to the fiberizing wheel and driven in rotation by the latter.

8. An apparatus according to claim 7, characterized in that the means for centrifugal projection of the composition has, at the point where the composition is released, a circular shape of which the axis is the axis of the fiberizing wheel, and of which the radius is at least equal to 70% of the radius of the fiberizing wheel.

9. An apparatus according to claim 6, characterized in that the projection means is generally in the shape of a disk, and in that the liquid composition is fed through a conduit located in the axis of the shaft of the fiberizing wheel.

10. An apparatus according to claim 9, characterized in that the disk is formed by two supports defining between them a compartment, connected with a feed conduit, and having at least one orifice from which the composition is released.

11. An apparatus according to claim 10, characterized in that the orifice is arranged on one side of the disk substantially perpendicular to the rotational axis.

12. An apparatus according to claim 10, characterized in that the projection disk is protected by a flange integral with the fiberizing wheel.

13. An apparatus according to claim 9, characterized in that the conduit for feeding the composition is located in a concentric conduit conducting cooling water into the wheel.

14. An apparatus according to claim 6, characterized in that the projection means has a compartment in which the composition is confined on at least one part of its path in the radial direction in relation to the axis of centrifugation.

15. An apparatus according to claim 6, characterized in that the projection means comprises a conicalshaped disk, the concavity of which is presented toward the fiberizing wheel.

16. An apparatus according to claim 6, characterized in that the orifices of the blowing element are arranged at a radial distance from the surface of the wheel $Y_{RJ}$ comprising between 10 and 200 mm.

17. An apparatus according to claim 6, characterized in that the distribution of the orifices on the blowing element is a function of the zone of the corresponding wheel, the orifices being more numerous facing the zones from where a large quantity of fibers are delivered.

* * * * *